J. D. GALLAGHER.
HINGED BACK FOR BRAKE SHOES.
APPLICATION FILED AUG. 9, 1913.
1,117,366.
Patented Nov. 17, 1914.
4 SHEETS—SHEET 1.
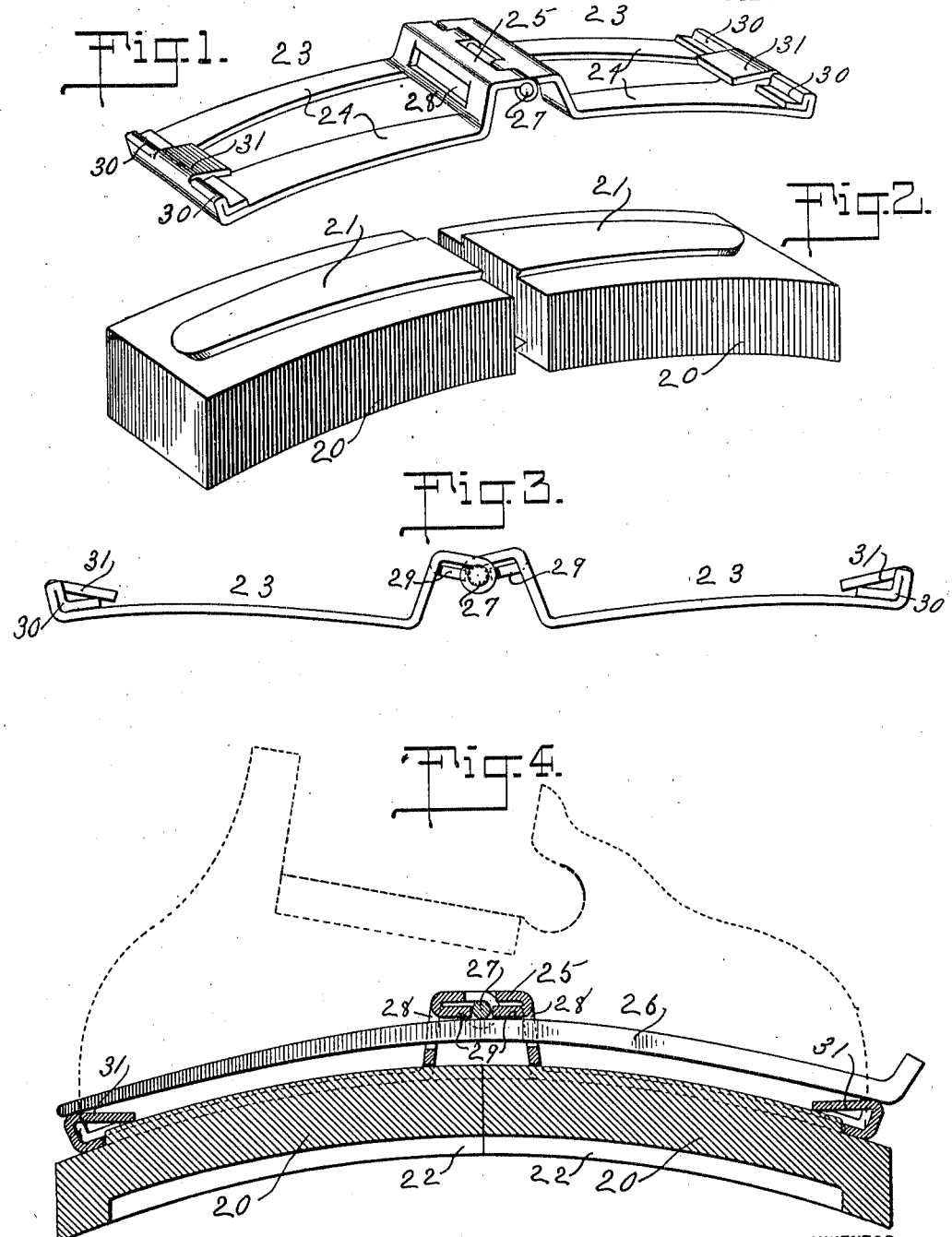

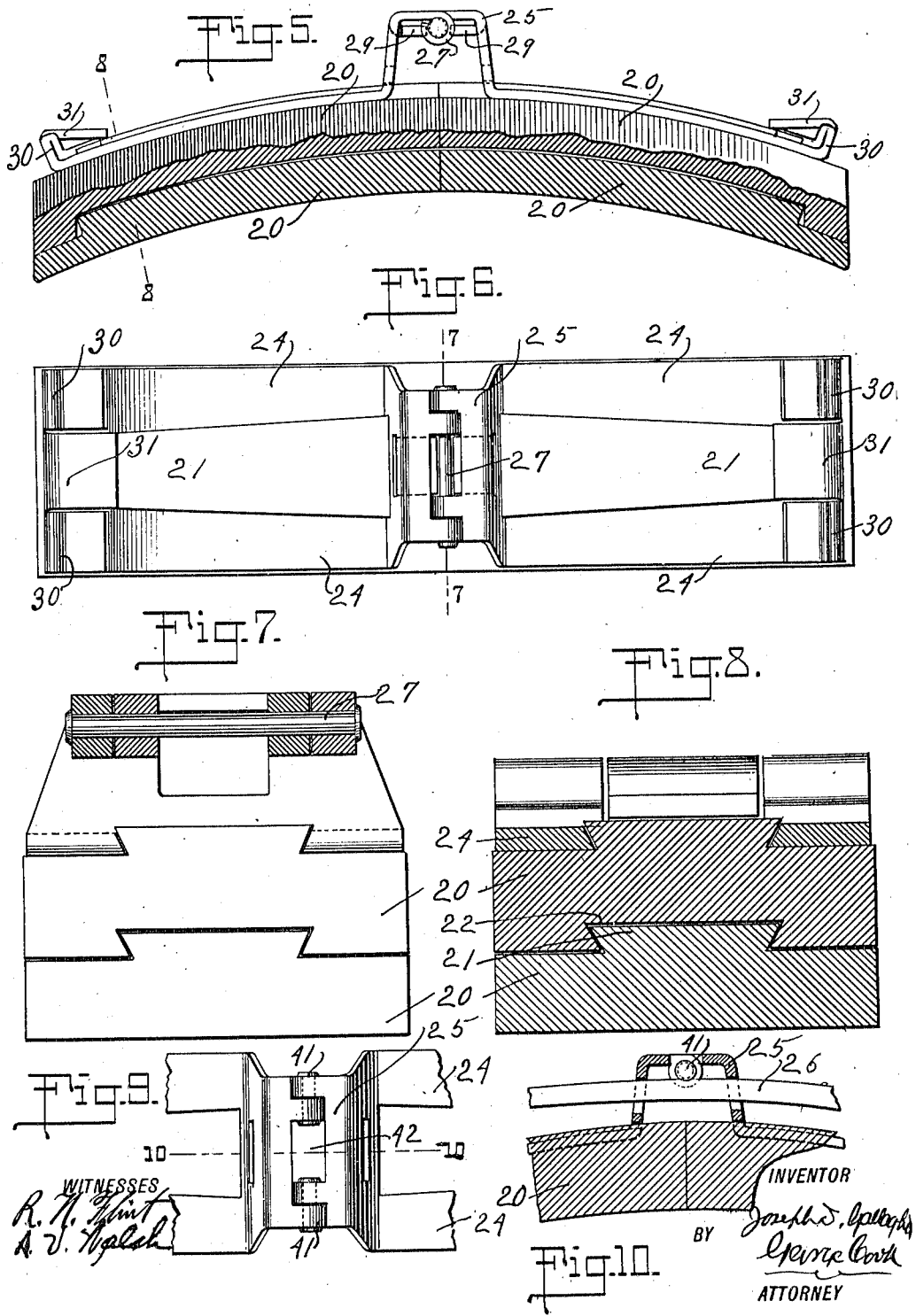

J. D. GALLAGHER.
HINGED BACK FOR BRAKE SHOES.
APPLICATION FILED AUG. 9, 1913.
1,117,366.
Patented Nov. 17, 1914.
4 SHEETS—SHEET 3.
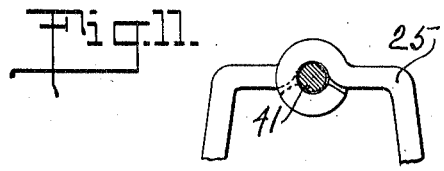
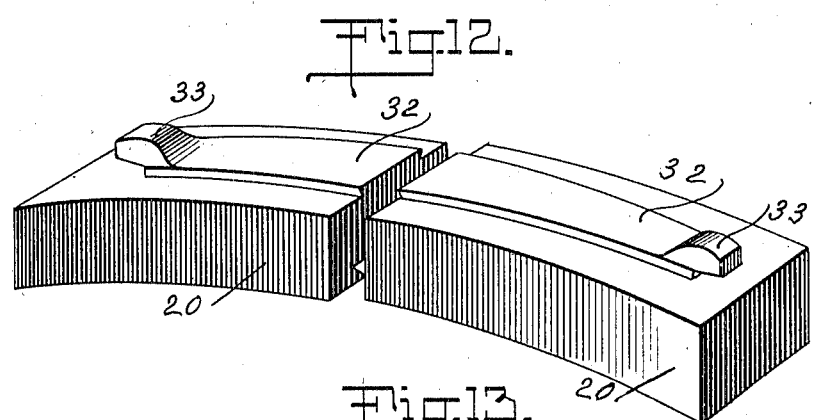
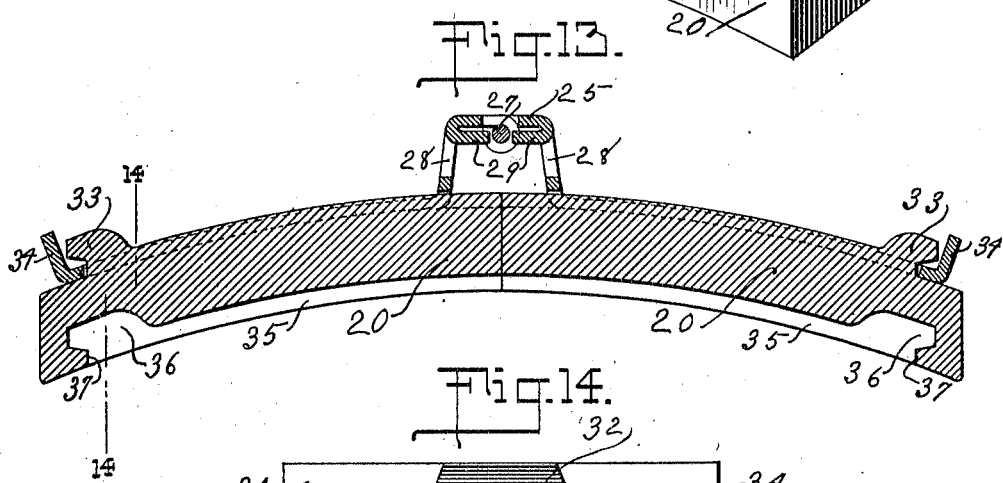
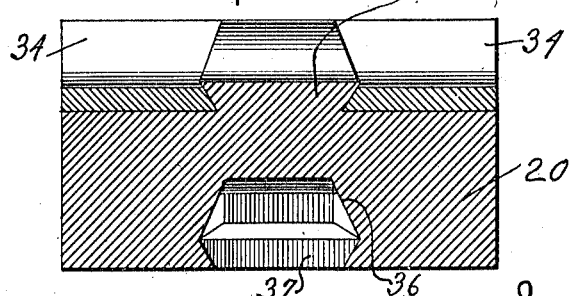
WITNESSES
INVENTOR
Joseph D. Gallagher
BY
ATTORNEY J. D. GALLAGHER.
HINGED BACK FOR BRAKE SHOES.
APPLICATION FILED AUG. 9, 1913.
1,117,366.
Patented Nov. 17, 1914.
4 SHEETS—SHEET 4.
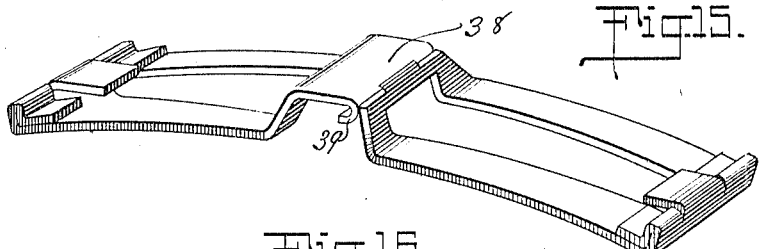
Fig.15.
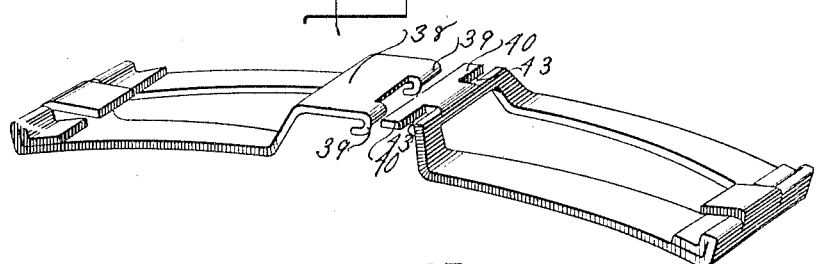
Fig.16.
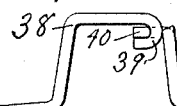
Fig.17.
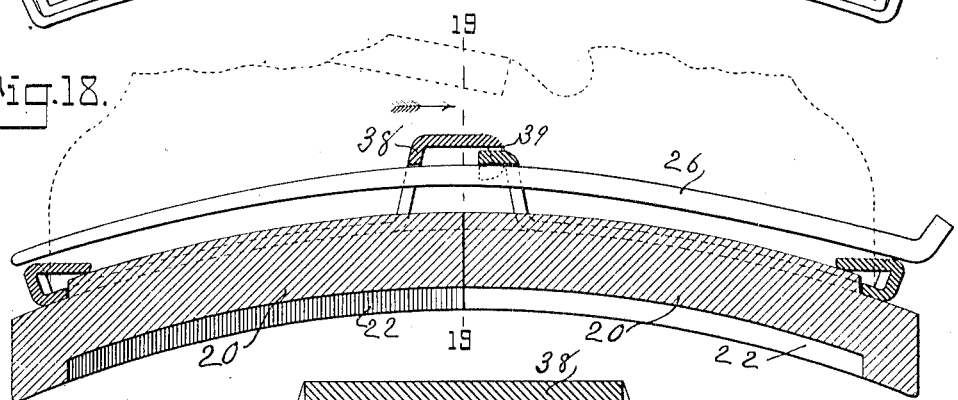
Fig.18.
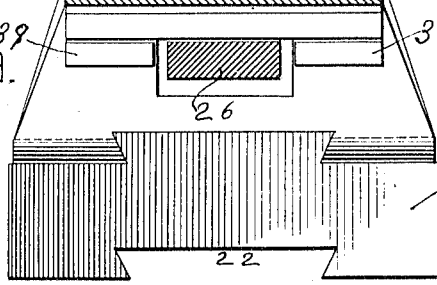
Fig.19.
WITNESSES
R. H. Flint.
A. V. Walsh.
INVENTOR
Joseph D. Gallagher
BY George Cook
ATTORNEY

UNITED STATES PATENT OFFICE.

JOSEPH D. GALLAGHER, OF GLEN RIDGE, NEW JERSEY, ASSIGNOR TO AMERICAN BRAKE SHOE & FOUNDRY COMPANY, OF MAHWAH, NEW JERSEY, A CORPORATION OF NEW JERSEY.

HINGED BACK FOR BRAKE-SHOES.

1,117,366.   Specification of Letters Patent.   Patented Nov. 17, 1914.

Application filed August 9, 1913. Serial No. 783,908.

*To all whom it may concern:*

Be it known that I, JOSEPH D. GALLAGHER, a citizen of the United States, and a resident of Glen Ridge, in the county of Essex and State of New Jersey, have made and invented certain new and useful Improvements in Hinged Backs for Brake-Shoes, of which the following is a specification.

My invention relates to brake shoes designed for use upon railway vehicles, and particularly to that kind or type of brake shoes commonly known and referred to as an interlocking shoe, and from the use of which no waste material or "scrap" results; this end being attained by securing a partially worn-out shoe in front of an unworn shoe, whereupon the partially worn-out shoe will be completely worn away. Thereafter, and when the unworn shoe above referred to shall have been partially worn away, it in turn is placed in front of and secured to the face of another unworn shoe and completely worn away, and so on indefinitely, each partially worn shoe being thus in turn secured to the face of an unworn shoe and entirely worn away, there being no waste of material of the body or fractional member of the shoe.

The objects of my invention are to provide a brake shoe of the type above referred to which shall be simple in construction and in which the worn and unworn sections, which form the body portion, may be more readily assembled, and held together more securely, than has heretofore commonly been the case; to provide a brake shoe in which the liability of the worn and unworn sections to become separated when the shoe is in service will be reduced to a minimum; to provide a shoe of this type with a back of a tough material, such as wrought iron or steel, to support the body portion of cast metal and capable of repeated use, and to otherwise improve upon and increase the efficiency of brake shoes of the type above referred to.

With the above and other objects in view, my invention consists in the improved brake shoe, and back therefor, illustrated in the accompanying drawings and hereinafter described and claimed, and in such variations and modification thereof as will be obvious to those skilled in the art to which my invention relates.

In the drawings wherein the preferred embodiment of my invention is illustrated, Figure 1 is a view showing my improved brake shoe back in perspective, the same comprising two sections pivotally connected with one another at the middle portion; Fig. 2 is a view showing the sectional body portion of my improved brake shoe in perspective; Fig. 3 is a view illustrating the position in which the sections of the back are placed preparatory to assembling the back and body of the shoe; Fig. 4 is a view mainly in section, showing the shoe supported from a brake head (shown in dotted lines) by a suitable key; Fig. 5 is a view showing a complete brake shoe, comprising a back and two body portions secured to one another to be worn away in succession; Fig. 6 is a view showing the same in plan; Fig. 7 is a view showing a section upon a transverse plane indicated by the line 7—7, Fig. 6; Fig. 8 is a view showing a section upon a transverse plane indicated by the line 8—8, Fig. 5; Fig. 9 is a fragmentary view showing another form of pivotal or hinge connection between the sections of the back; Fig. 10 is a view showing a section upon a plane indicated by the line 10—10, Fig. 9; Fig. 11 is a view showing the connection shown in Figs. 9 and 10 in side elevation; Fig. 12 is a view showing a modified form of the sectional body portion of my improved shoe in perspective; Fig. 13 is a view showing a longitudinal section of the same assembled with the back; Fig. 14 is a view showing a section upon a transverse plane indicated by the line 14—14, Fig. 13; Fig. 15 is a perspective view showing my improved brake shoes back equipped with another form of pivotal connection between the sections thereof; Fig. 16 is a similar view showing the two parts of the back detached from one another; Fig. 17 is a view showing the same in side elevation; Fig. 18 is a view showing the form of back illustrated in Figs. 15 to 17 assembled with a sectional body portion and the shoe thus produced secured to a brake head (shown in dotted lines) by means of a suitable key, and Fig. 19 is a view showing a section upon a transverse plane indicated by the line 19—19, Fig. 18.

Referring to the drawings, the reference numeral 20 designates a plurality of body sections, each extending transversely to and throughout the width of the shoe, and which sections, collectively, form the body portion of my improved shoe, although at certain times when the shoe is in use, as will hereinafter appear, and as shown in Figs. 5, 7 and 8, two sections are arranged, one upon the other, throughout the length of the shoe, in which instance the body portion of the shoe might properly be described as made up of two superposed sets of sections like the sections 20, each set extending throughout the length of the shoe. The sections 20 are commonly made from cast iron, of a quality and composition selected with reference to long service as well as a maximum of frictional or retarding action when the shoe is applied to a car wheel.

The drawings illustrate brake shoes in which the body portion is made up of two sections, or of four sections when two series of sections are superposed one upon the other, although the body portion of my improved brake shoe may obviously be made up of any number of sections greater than one. The sections which collectively form the body portion of my improved brake shoe are so formed that worn sections may be placed in front of unworn sections and secured thereto, so that when the shoe thus produced is used, the partially wornout sections will be worn entirely away; from which it follows that no "scrap" or waste material will result when the shoe is used. Thus, referring to Figs. 5, 7 and 8, the lower sections 20 have been partially worn out in service, and are shown as secured to the front or wearing faces of the upper unworn sections 20. When the shoe thus formed is used the lower sections 20 will be first entirely worn away, after which the upper unworn sections will be worn as thin as practicable, whereupon they will be removed from the supporting back of the shoe and placed in front of other unworn sections to be in their turn entirely worn out, and so on indefinitely.

The means whereby it is made possible to secure partially worn-out sections to the front or wearing face of unworn sections are shown as comprising a longitudinally extending lug 21 located upon the rear face of each section 20, and a recess 22 corresponding in size and form with said lug and located upon the front face of said section. The lug and recess are preferably made tapering, and undercut or dovetailed, as shown in the drawings, from which it will be understood that the lug upon the back of a partially worn-out section may be placed within the recess upon the face of an unworn section, and the sections moved longitudinally relative to one another to bring them into a position in which one section overlies the other as shown in Fig. 5, whereupon the worn section will be secured to the face of the unworn section. The larger ends of the tapering lugs and recesses lie at the center of the shoe, in the preferred form of my invention illustrated, so that longitudinal movement of the partially worn sections will be prevented, as movement of either section upon one side of the center of the shoe will be opposed by the corresponding section upon the other side of the center, which cannot move farther into its recess because of the tapering form of the recesses and lugs.

The sectional body portion of my improved brake shoe is detachably secured to a supporting back made preferably from wrought iron or steel plate stock of from ⅛" to ¼" in thickness, or thereabout, the said back being made up of a plurality of sections pivotally connected with one another in the embodiment of my invention illustrated. The back therefore serves as a member through which the body of the shoe is supported from a brake head or equivalent supporting element, which back, being of a tough and strong material, is well suited to withstand the strains encountered when the shoe is in service; and the fact that the sections of the back are detachable from the sectional body portion of the shoe permits a single back to be used repeatedly.

The supporting back above referred to is shown as made up of two similar sections 23 having each two sides 24 so shaped as to provide a tapering opening between them within which the tapering lugs 21 upon the backs of the sections 20 lie when the shoe is assembled. These sides are beveled upon their inner edges to fit the beveled or undercut sides of the lugs 21, and are in contact with said lugs throughout substantially their entire length, thus providing an extensive and strong connection between the body section and the sections of the back. The inner or adjacent ends of the back sections are so bent as to extend upward from the rear face of the body of the shoe to thereby provide a centrally located key lug 25, through which the shoe may be secured to a brake head, or equivalent support, as by means of the key 26, said sections being pivotally connected by a centrally located hinge connection at 27. The portion of metal cut free in providing the holes 28, through which the key 26 extends, is preferably bent under the top of the attaching lug 25, as shown at 29, to thereby provide an extending bearing for the key 26 and prevent the hinge or pivotal connection between the sections from being injured when the shoe is in use. The end portions of the back sections are also slitted and shaped to form thrust receiving end stops or lugs 30 and a central stop or lug 31, whereby the ends of the shoe are properly supported and held in position when the same is secured to the standard form of brake head.

In the form of pivotal connection shown in Figs. 9 to 11 the bearings 29 above referred to are omitted, and the central portion of the pin of the hinge connection 41 which lies above the securing key when the shoe is secured to a brake head is cut away as shown at 42 to thereby prevent the key from bearing directly upon an element of the hinge or pivotal connection, which, if permitted, might cause injury to the latter.

Figs. 12 to 14 of the drawing illustrate a form of sectional body in which a longitudinally extending lug 32, similar to the lug 21, is employed, but which lug is provided with an upwardly extending hook 33 at its outer end; this hook lies above the back of the shoe when assembled therewith and takes the place of the lug 31 hereinbefore referred to, side end stops or lugs 34 being provided by bending the end of the section of the back upward, it being unnecessary to slit the outer ends of the back sections in this form of shoe, as the hook 33 forms the central end stop or lug. The recess 35 in the front face of the body sections in this form of my improved brake shoe is enlarged to receive the hook 33 of a partially worn-out section, as shown at 36, and provided with a transverse ledge 37 with which the hook of a worn section engages, thus greatly strengthening the connection between the unworn and worn sections at the ends of the shoe.

In Figs. 15 to 19 I have shown my improved brake shoe as provided with a back having a different form of pivotal connection between its sections than the forms of connection hereinbefore described; the body sections being of the form first described although it is obvious that either of the forms of body sections herein specifically referred to may be used. In this form of back the upwardly bent portion 38 of one of the back sections, which portion forms a part of the key lug, is provided with hooks 39 at its free end; and the upwardly bent portion of the other section is recessed as shown at 43 to provide lugs 40 with which said hooks may engage in the manner shown in the drawings. It will be understood, however, that my invention includes any form of pivotal connection between the sections of the supporting back.

In assembling the parts hereinbefore referred to the worn and unworn sections are first assembled, after which the hinged back is opened somewhat as shown in Fig. 3, and the sections assembled with the back by placing the top lug of the unworn sections between the sides of the back and moving them outwardly from the center of the shoe; or, as will be understood, the unworn sections may be first assembled with the back and the worn sections then put in place. After the back and sections of the body are assembled, the inner ends of the several sections contact with one another as the hinged back is swung into the position it takes when the shoe is in use, thereby holding the body sections and back together.

Having thus described and explained my invention, I claim and desire to secure by Letters Patent:

1. A back for a brake shoe comprising a plurality of sections pivotally connected at their adjacent edges.

2. A back for a brake shoe comprising a plurality of sections the adjacent ends of which extend upward to thereby provide a key lug and which ends are pivotally connected with one another.

3. A back for a brake shoe comprising two sections the adjacent ends of which extend upward to thereby provide a key lug and which ends are pivotally connected with one another, and the remote ends of which sections are provided with upwardly extending end stops.

4. A back for a brake shoe comprising two sections having each means for engaging a securing lug of a section of the body of a sectional brake shoe and the adjacent ends of which back sections extend upward to thereby provide a key lug, and which ends are pivotally connected with one another.

5. A back for a brake shoe divided transversely about the middle of its length, the sections being connected at their adjacent edges.

6. A back for a brake shoe provided with a key lug and divided transversely at about the middle of said key lug, the adjacent edges of the sections being connected.

7. A back for a brake shoe provided with a key lug at about the middle of its length, said key lug being divided transversely; the adjacent edges of the sections being pivotally connected.

8. A back for a brake shoe divided transversely at about the middle of its length, the adjacent ends of the sections being hinged together and formed into a key lug.

Signed at New York, borough of Manhattan, in the county of New York and State of New York, this 31st day of July, 1913.

JOSEPH D. GALLAGHER.

Witnesses:
MARY B. JUSTICE,
ANNA V. WALSH.